Patented Mar. 4, 1941

2,233,959

UNITED STATES PATENT OFFICE 2,233,959

METHOD FOR THE PURIFICATION OF SOLVENT MIXTURES

Louis M. Plansoen, Upper Montclair, N. J.

No Drawing. Application May 5, 1938,
Serial No. 206,253

5 Claims. (Cl. 202—57)

The present invention relates to solvent recovery in connection with the manufacture of coated materials and more particularly the invention relates to a method for the purification of solvent mixtures recovered during the manufacture of artificial leather or other coated products in which nitrocellulose, cellulose acetate or other cellulose compound dissolved in a solvent material is applied to a material and in which solvents are recovered and used over again.

In the coating of materials, the "dope" containing the nitrocellulose mixture together with the solvent material is suitably applied to the material to be coated. In the drying process, the solvent material is recovered by evaporation and condensation but the material, as thus recovered, can not be used in this form for the reason that it contains coloring material and impurities which would stain material and would produce changes in color during manufacture so that a uniform product could not be produced if this recovered solvent mixture were employed in the method.

For example, the solvent mixture as generally used in the coating of fabric in the production of artificial leather contains grain alcohol, a petroleum hydrocarbon of low boiling-point range and methyl ethyl ketone. After the solvent has been used with nitrocellulose or other cellulose compound, such as cellulose acetate, in the coating of fabric, the solvent mixture contains certain impurities which cannot be removed by ordinary distillation or by distillation under reduced pressure.

Many attempts have been made to purify the recovered solvents by means of chemicals and by filtering through carbon and various other means, but none of the methods of purification used heretofore have resulted in producing a product which is sufficiently pure to render it suitable to use with fresh solvent in ordinary manufacture. It has been necesary therefore to use the recovered solvent for other purposes or in the production of coated materials of dark color or in compositions in which the impurities remaining in the recovered solvent are not a detriment.

Most of the impurities present in the solvent are of a complex nature, but the solvent mixture usually contains also particles of dust or fibre particles, some of which become entrained with solvent vapors during distillation and are not completely removed by ordinary filtration.

I have discovered that by treatment of the recovered solvent mixture with a finely divided alkali-metal hydroxide, such as flake pure caustic soda, and agitating the mixture so that the flake material comes into contact with substantially the whole body of the liquid, the alkali-metal hydroxide acts as a sort of drag net to take up impurities and to entangle the suspended particles together with coloring matter, and other complex impurities.

After shaking or otherwise agitating the solution for a sufficient length of time, as for a half hour in most cases, the mixture is allowed to stand to permit the layer of impurities and caustic soda or other metal hydroxide to settle out.

The impurities generally include a small proportion of water or moisture and have a higher gravity than the solvent material. After a definite layer has formed at the bottom of the receptacle in which the mixture is allowed to settle, the upper or solvent layer is decanted off. Under some circumstances, it is preferable obviously to syphon off the lower layer, particularly in the event that very large quantities are treated and for this purpose, a container having an inwardly tapering bottom may be used in order to concentrate the lower layer as siphoning proceeds, by which the last traces of the impurities may be readily removed from the supernatant solvent layer.

In the treatment of the solvent mixture with flake or powdered caustic soda, I preferably heat the mixture during or after agitation which assists in obtaining intimate contact by means of the circulation induced by changes in temperature which serves also to obtain more rapid settling of the impurities and the caustic soda layer.

In place of powered or flaked caustic soda, I may use powdered or otherwise comminuted caustic potash, known chemically as potassium hydroxide, or any substitute which operates in substantially the same way as the caustic soda, or sodium hydroxide. It will be understood, however, that the cost of potassium hydroxide is considerably greater than that of caustic soda, and it has the disadvantage moreover that it is more corrosive as regards glassware. Furthermore, the operation of caustic soda is more satisfactory, in general, particularly if the flake form of the material is used.

After the supernatant solvent layer has been decanted, or the layer of impurities has been siphoned off, the solvent mixture is distilled by means of heat, under atmospheric pressure or under reduced pressure as may be desired. Ordinarily the solvent material is sufficiently purified after the treatment above described with a single distillation, but it will be understood that further distillation may be employed if desired.

As a specific example of the method of the invention as applied to impure recovered solvent from the application by coating of nitrocellulose or acetate upon various materials, the following may be given:

To a mixture of one hundred pounds of the solvent mixture containing substantially equal parts of grain alcohol, low-boiling petroleum hydrocarbon and methyl ethyl ketone, I add about one percent by weight, or one pound, of flaked NaOH and agitate the mass to insure complete contact of the flakes throughout the body of the liquid. I then heat the liquid mass with further stirring or agitating to a temperature of about 100° F., (or any suitable heat) at which temperature there is a comparatively rapid settling of the caustic layer and the impurities associated therewith. The flaked caustic appears to act in much the same way in dragging down impurities as the alum in water purification, in which it is known that the colloidal aluminum hydroxide entangles the microscopic dirt particles or impurities. The action of the flaked caustic soda is somewhat different, however, as it does not involve the precipitation of a layer within the liquid, but appears to be partly mechanical in occluding impurities. After the mixture has settled for a sufficient length of time so that the supernatant liquid is clear and there is a definite plane of division between the solvent layer and the layer of caustic and impurities, the upper layer is decanted and distilled in the usual manner.

It will be understood that various changes or modifications may be made in carrying out the method of my invention as will be apparent to those skilled in the art without departing from the spirit or scope of the invention as defined in the claims. It will be understood that the method of my invention is applicable to solvent mixtures employed in the coating of materials with nitrocellulose or cellulose acetate or where any coating is applied and solvents are recovered and used again in which the composition of the mixture includes other solvents than those specifically referred to above, or in which the specific solvents differ to some extent from those referred to. The method is applicable to solvent mixtures in which the methyl ethyl ketone, for example, is replaced by another low-boiling ketone, or in which other low-boiling alcohols, other than C₂H₅OH, are present.

Having thus described the invention, what is claimed as new is:

1. A method for the purification of solvent mixtures containing impurities as dust, fibre particles and coloring matter, as recovered in the manufacture of coated materials in which the material is coated with a cellulose ester dissolved in a solvent mixture of grain alcohol, a low-boiling petroleum hydrocarbon and methyl ethyl ketone, which comprises adding a finely divided dry alkali-metal hydroxide to the mixture, agitating the mass to obtain intimate contact of the said hydroxide with the body of the mixture, thus causing the said hydroxide to take up impurities and entangle the suspended particles together with coloring matter, heating the said mixture, allowing the mixture to stand to separate into layers in which the hydroxide and impurities form the lower layer, separating the solvent layer from the said lower layer and distilling the said solvent layer to complete the purification thereof.

2. A method for the purification of solvent mixtures containing impurities as dust, fibre particles and coloring matter, comprising alcohol, petroleum hydrocarbons and a low-boiling ketone, which comprises adding a finely comminuted alkali-metal hydroxide to the solvent mixture, agitating the admixture to obtain intimate contact of the said hydroxide with the solvent mixture throughout the body thereof, thus causing the said hydroxide to take up impurities and entangle the suspended particles together with coloring matter, heating the admixture, allowing the admixture to separate into an upper solvent layer and a lower layer containing impurities, removing the upper layer from the lower layer and distilling the upper solvent layer.

3. A method for the purification of solvent mixtures containing impurities as dust, fibre particles and coloring matter comprising grain alcohol, low-boiling petroleum hydrocarbons and methyl ethyl ketone, said solvent mixture being recovered in the manufacture of nitrocellulose-coated materials which comprises adding comminuted caustic soda to the mixture, agitating the admixture to obtain intimate contact of the caustic soda therewith, thus causing the said caustic soda to take up impurities and entangle the suspended particles together with coloring matter, allowing the admixture to settle into layers, separating the layers and distilling the solvent layer to further purify the same.

4. A method for the purification of solvent mixtures containing impurities as dust, fibre particles and coloring matter, comprising grain alcohol, a low-boiling petroleum hydrocarbon and methyl ethyl ketone, said solvent mixture being recovered in the manufacture of nitrocellulose coated materials which comprises incorporating flaked caustic soda into the said mixture, agitating the mass to obtain intimate contact of the liquid with particles of the caustic soda, thus causing tne said caustic soda to take up impurities and entangle suspended particles together with coloring matter, heating the mixture to a temperature below the boiling point of the mixture, allowing the caustic soda and impurities to settle, separating the solvent layer from the caustic soda and impurities and distilling the solvent layer.

5. A method for the purification of a solvent mixture containing impurities as dust, fibre particles and coloring matter and comprising grain alcohol, a low-boiling petroleum hydrocarbon and a low-boiling ketone, for the manufacture of coated materials in which a cellulose ester is used which comprises treating the mixture with about one percent by weight of a finely divided alkali-metal hydroxide, agitating the mass, thus causing the said hydroxide to take up impurities and entangle suspended particles together with coloring matter, heating the mass to a temperature of about 100° F., allowing the impurities to settle into the lower layer, syphoning off the lower layer, then distilling off the solvent and condensing the vapors thereof.

LOUIS M. PLANSOEN.